United States Patent [19]

Sacconi

[11] Patent Number: 5,755,391
[45] Date of Patent: May 26, 1998

[54] FISHING REEL WITH A LOCKABLE, CHANGEABLE CARTRIDGE SPOOL

[76] Inventor: Roberto Luis Sacconi, Chacra 50, Junin De Los Andes, Neuquen, Argentina, 8371

[21] Appl. No.: 599,130

[22] Filed: Feb. 9, 1996

[51] Int. Cl.⁶ .................................................. A01K 89/015
[52] U.S. Cl. .......................... 242/312; 242/317; 242/597.3
[58] Field of Search .................................. 242/317, 318, 242/322, 282, 310, 312, 597.1, 597.3

[56] References Cited

U.S. PATENT DOCUMENTS

| | | | |
|---|---|---|---|
| 2,153,666 | 4/1939 | Hill et al. | 242/597.3 |
| 3,765,618 | 10/1973 | Johnson et al. | 242/317 |
| 3,806,060 | 4/1974 | Valentine | 242/318 X |
| 3,829,034 | 8/1974 | Mickelson | 242/597.3 |
| 3,937,411 | 2/1976 | Vogel et al. | 242/597.3 |
| 4,461,435 | 7/1984 | Kovalovsky | 242/318 X |
| 5,120,003 | 6/1992 | Sacconi | 242/317 |
| 5,372,322 | 12/1994 | Fortson | 242/317 X |
| 5,556,049 | 9/1996 | Bennett et al. | 242/318 X |

*Primary Examiner*—Daniel P. Stodola
*Assistant Examiner*—Emmanuel M. Marcelo
*Attorney, Agent, or Firm*—Malin, Haley, DiMaggio & Crosby

[57] ABSTRACT

A fishing reel for fly fishing that utilizes individually removable, interchangeable cartridge spools that contain different fishing lines of desired weights and densities that the user can install or remove. The individual cartridge spool is held in place by a locking member to prevent its inadvertent separation from the flange plate which houses the reel spool during the operation of changing cartridge spools. Unlocking the cartridge spool requires the user to manually pull the cartridge spool away from the flange plate. This causes the locking member to automatically spring tension release the cartridge reel. The locking member is manually positioned in place to lock the cartridge spool after it is installed.

11 Claims, 3 Drawing Sheets

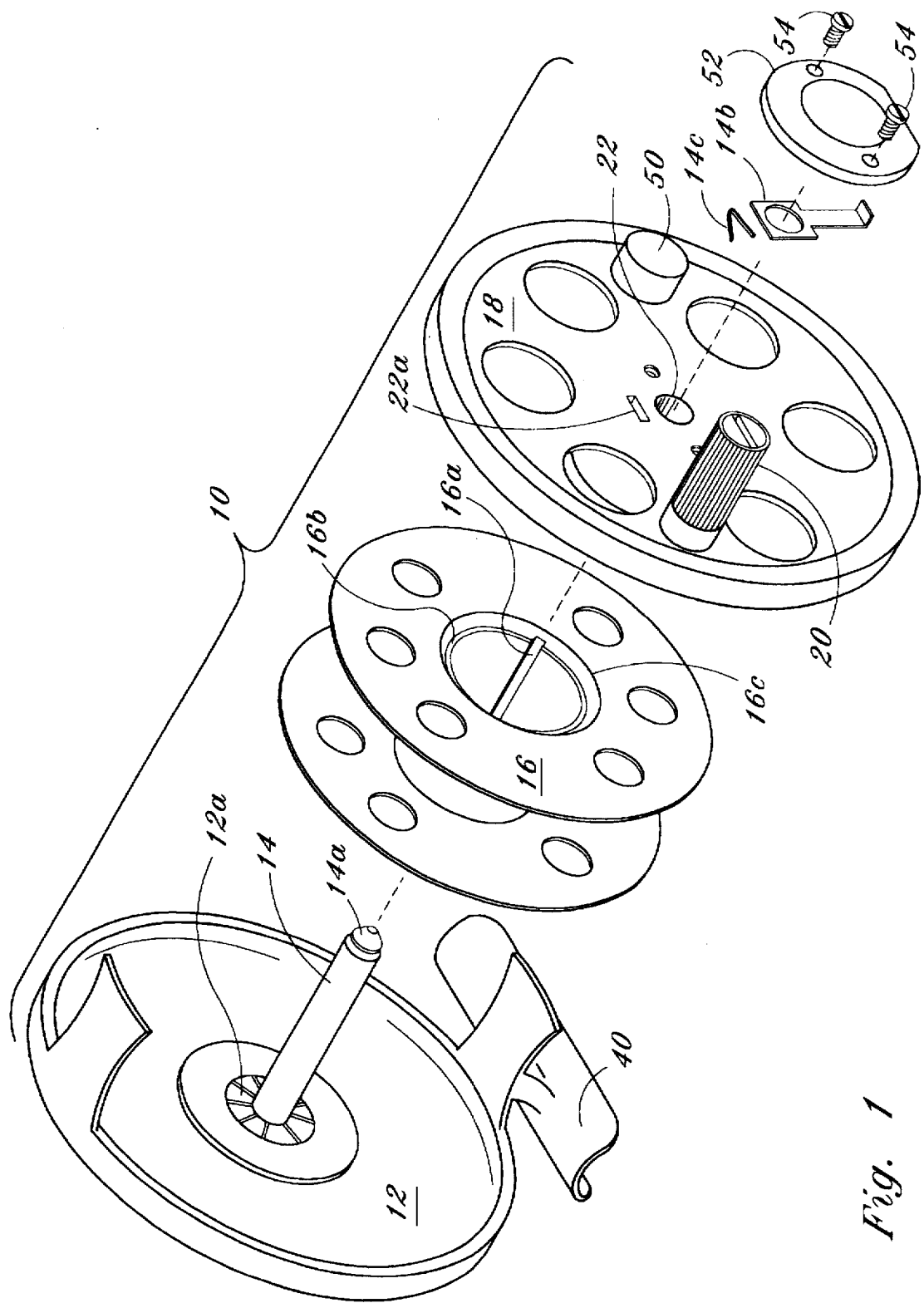

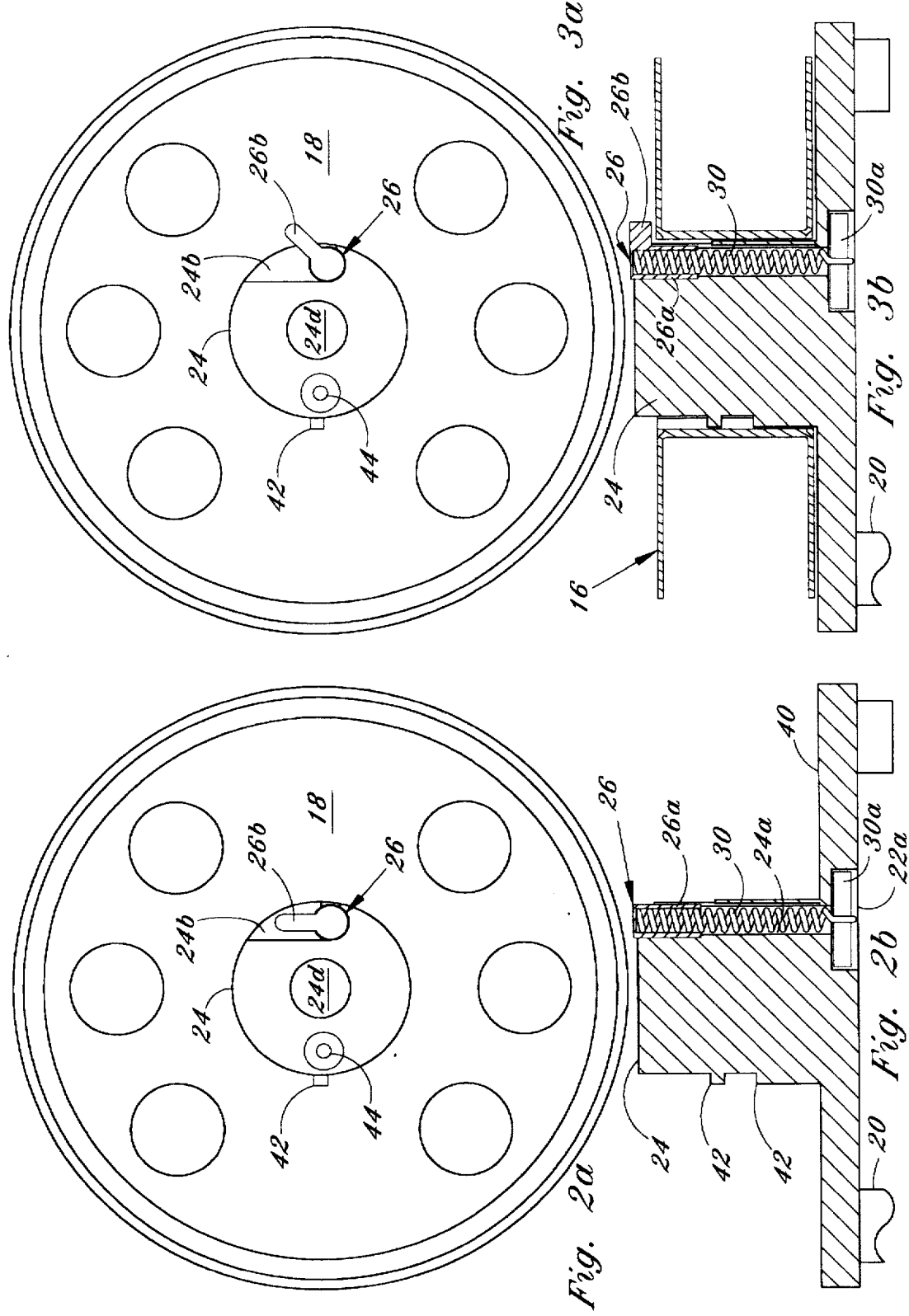

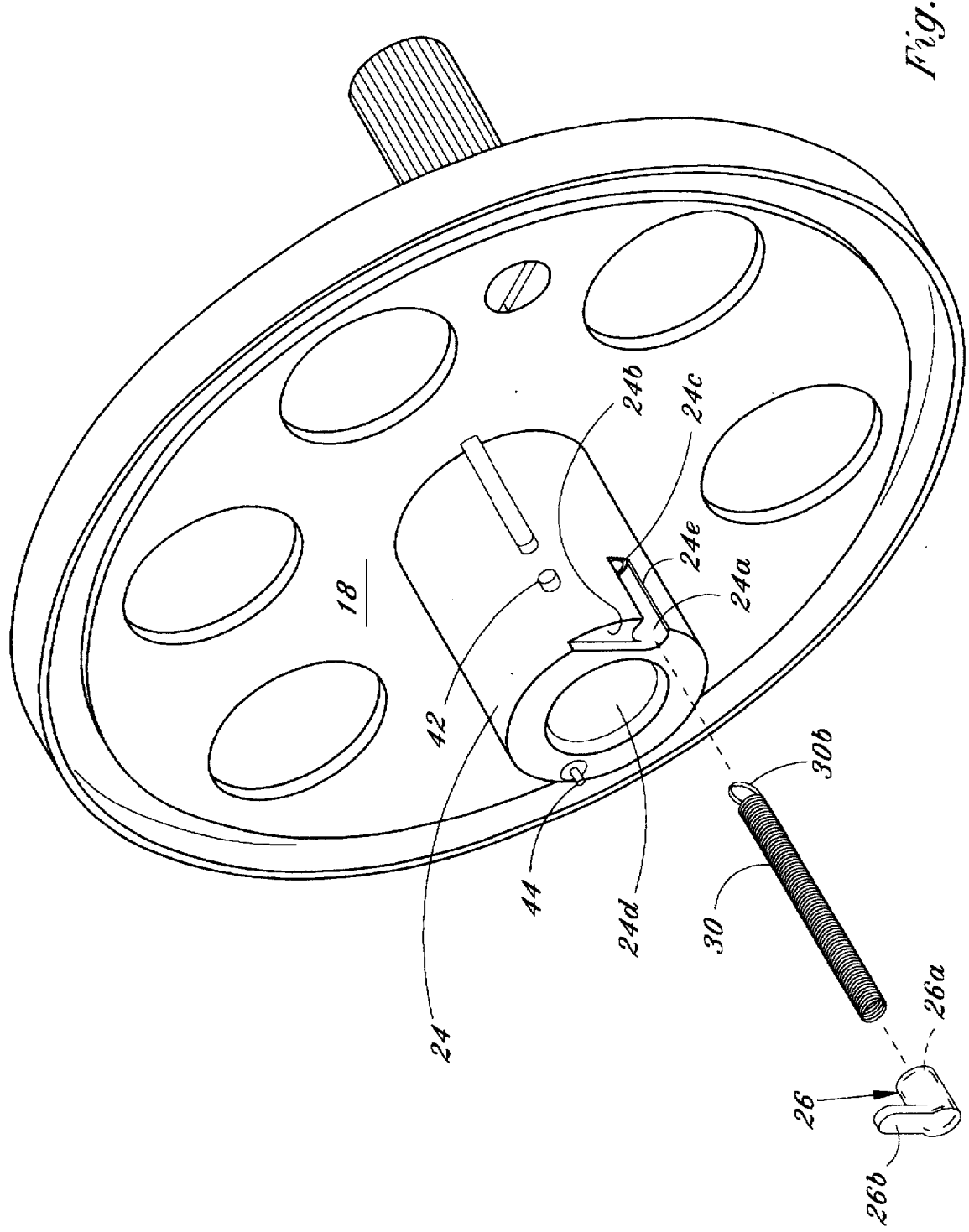

FISHING REEL WITH A LOCKABLE, CHANGEABLE CARTRIDGE SPOOL

BACKGROUND OF THE INVENTION

1. Field of the Invention

This invention relates generally to fishing reels used for fly fishing and spinning fishing, and specifically to a fishing reel that utilizes interchangeable and removable cartridge spools to permit the use of different fishing lines of different weights and densities with a single reel. The invention provides a spool cartridge lock to prevent separation of the cartridge spool whenever the reel is opened, and an easy way to exchange cartridges or change from right to left retrieve by flipping over the cartridge.

2. Description of the Prior Art

Fly fishing and spinning fishing reels are well known in the art. One of the great drawbacks in both the spinning reel and fly fishing reel is that the spool containing the fishing line is typically a rigid structure that requires the fishing line to be directly removed from the reel spool and a new line added directly to the reel spool. U.S. Pat. No. 5,120,003 provides for a reel that has changeable fishing line cartridge spools, so that fishing lines of different sizes and weights and densities can be interchanged on a single reel through the introduction of a separate cartridge spool that contains the desired line. The new spool end plate is removed allowing access to the cartridge spool for installation and removal.

It is important to insure that whenever the fishing reel end flange plate is disengaged from the fishing reel frame that the cartridge spool does not inadvertently or accidently separate from the reel spool. In the prior art devices whenever the end flange plate was removed from the reel housing, the cartridge spool was free to slide from the reel spool. This allowed accidental separation of the cartridge spool once the end plate was disengaged from the housing.

The present invention overcomes accidental separation by providing for a cartridge spool locking device that is manually engaged and manually overridden to maintain the cartridge spool in the proper position on the reel frame.

The cartridge spool locking device of the present invention is unlocked by manually pulling on the cartridge spool which causes a spring-actuated lever to be released. The locking device for the cartridge spool does not otherwise alter the operation of the cartridge spool or the fishing reel in its normal operation and provides an easy way to exchange cartridges or change from right to left retrieve by flipping over the cartridge.

SUMMARY OF THE INVENTION

A fishing reel especially suited for fly fishing, said fishing reel including an interchangeable cartridge spool which allows for the interchange of cartridge spools, the reel including a cartridge spool locking device to prevent accidental separation of the cartridge spool from the fishing reel spool whenever the fishing reel frame is separated from the end flange plate and to provide an easy way to exchange cartridges or change from right to left retrieve by flipping over the cartridge. The fishing reel is comprised of a circular, disk-shaped, rigid frame, having a central elongated shaft permanently attached at one end to the center of the circular frame, a removable end flange plate having a cylindrically-shaped end plate spool attached at one end to the center of said removable end flange plate, said end plate spool itself having a passage therethrough that receives the elongated shaft from the frame and an outer diameter adapted for snugly mating with a removable cartridge spool that fits over the flange plate spool, said cartridge spool containing a fishing line and a manually actuated locking member attached to said cylindrical end plate spool for retaining said cartridge on said spool unless it is deliberately manually removed. The cartridge spool can be manually inserted or removed, and slides over the cylindrical end plate spool, the cartridge having a key slot therein which engages a raised flange on the spool to prevent relative rotation between the end plate spool and the cartridge spool. The cartridge spool locking member is manually rotated after the cartridge spool has been inserted to cover a portion of one end face of the cartridge spool, thereby preventing its accidental separation from the end plate spool and providing an easy way to exchange cartridges or change from right to left retrieve by flipping over the cartridge.

The cartridge spool locking device is mounted in a pre-formed (molded) or pre-bored passage in the end plate spool that also receives the cartridge spool. The locking device has an L-shaped member with a hollow passage that receives one end of a spring, which is also mounted within a passage defined in the end plate spool. A pin is inserted in the spool passage to prevent rotation or dislodging of the spring that is firmly attached at the other end to the locking member. At the factory, when the spring and locking member are installed in the reel spool passageway, the spring is rotated relative to the locking member to produce rotational spring tension that is used to move the locking member to the unlocked position as described below. The spring is also stretched longitudinal to produce tension between the locking member and a spring holding pin.

The reel end flange plate that includes the end plate spool is removably attached by a spring-loaded retainer to the reel frame shaft for quick removal.

The fishing reel may also include a drag mechanism which is conventional in structure and operation.

To use the present invention, the reel end flange plate is manually removed from the reel frame by pressing against a spring-actuated retainer clip that unlocks the reel frame shaft from the end plate, allowing the end plate to be separated from the reel frame. Mounted removably on the end plate spool is the cartridge spool that is to be removed and replaced with a cartridge spool having a different line. The cartridge spool is held firmly to the end plate by the locking member, which is in contact with a small portion of the cartridge spool housing near its central aperture or passageway. In order to remove the cartridge spool, the user merely pulls manually, separating the end plate from the cartridge spool, which forces the locking member, which is L-shaped, to rotate under spring tension to a position within the circumference of the end plate spool, disengaging the cartridge spool, allowing it to be manually removed from the end plate spool.

At this point, a different cartridge spool having a different line is manually inserted on the end plate spool in keyed relationship with the key slot on the cartridge spool and the raised flange on the end plate spool until one end of the cartridge spool engages the end plate. The locking member is then manually rotated approximately 90 degrees to extend radially, engaging a small portion of the cartridge spool housing on one side, preventing its inadvertent separation from the end plate. The end plate is now ready to be reinstalled on the reel frame shaft, where it is locked in position by a spring-loaded retainer clip. The retainer clip has a slotted opening that is engaged in an annular recess at the tip end of the reel frame shaft. The retainer clip locking mechanism is conventional.

The present invention allows for the efficient interchange of line-bearing cartridge spools in order to employ a variety of different fishing lines on a single fishing reel easily and quickly, and provides an easy way to change from right to left hand retrieve while preventing inadvertent separation of the cartridge spool from the reel spool until desired. If the user is fishing in a stream and decides to change fishing lines due to weights or densities of the more desired line, the fishing reel end plate can be removed from the reel frame without inadvertent separation of the cartridge spool bearing the line until the user is absolutely ready to physically and manually interchange cartridge spools. Thus, the locking device on the reel spool that retains the cartridge spool insures that only when the user is ready to manually separate the cartridge spool from the end plate spool will the cartridge spool be removed.

It is an object of this invention to provide an improved fishing reel that utilizes interchangeable cartridge spools bearing different fishing lines.

It is another object of this invention to provide an improved fishing reel that includes a cartridge spool locking device to prevent accidental separation of a cartridge spool bearing a fishing line from the end plate spool and an easy way to change from right to left hand retrieve.

In accordance with these and other objects which will become apparent hereinafter, the instant invention will now be described with particular reference to the accompanying drawings.

BRIEF DESCRIPTION OF THE DRAWINGS

FIG. 1 shows a perspective exploded view of an improved reel in accordance with the present invention.

FIG. 2a shows an end elevational view of the flange plate in accordance with the present invention with the locking member in the unlocked position.

FIG. 2b shows a top plan view of the flange plate shown in FIG. 2a, partially in cross section, showing the locking member and spring.

FIG. 3a shows an end elevational view of the flange plate shown in FIG. 2a, with the locking member in the locked position.

FIG. 3b shows a top plan view of the flange plate shown in FIG. 3a, including a cartridge spool and the locking member in the locked position.

FIG. 4 shows the end plate in a perspective exploded view with the locking member and spring exploded away from the end plate.

DESCRIPTION OF THE PREFERRED EMBODIMENTS

Referring now to the drawings and in particular FIG. 1, the present invention is shown generally at 10 comprising a fishing reel particularly suited for fly fishing that includes a rigid metal, disk-shaped reel frame 12 having a fixed shaft 14 permanently attached at one end, substantially perpendicular to the center of the reel frame 12 projecting outwardly. The rigid shaft 14 includes a grooved annular channel at free end 14a that receives a off center tab 14b with an aperture and spring 14c mounted on reel end flange plate 18 within end retainer 52 by screws 54. The reel frame 12 may have permanently attached thereto a flange 40 that is used to attach the reel to a rod in a conventional manner. Recess 22a received a spring holding pin 30a (FIG. 2b). Aperture 22 receives shaft 14 and shaft end 14a wherein the annular channel at end 14a engages tab 14b aperture to lock removably the reel frame 12 to plate 18. Depressing tab 14b against spring cup 14c releases the shaft end 14a to open the reel 10.

The fishing reel 10 includes a removable fishing line cartridge spool 16 that includes a central passage 16b and a groove 16a used to receive a flanged key to prevent relative rotation between cartridge spool 16 and end plate spool 24 (FIG. 2a) which is permanently attached to end flange plate 18, which is removable. The cartridge spool 16 would contain a fishing line of a particular size, weight, and density, which has been omitted for clarity. The user would possess a series of interchangeable cartridge spools, each bearing a different line of a different size, weight, or density, and change from right to left retrieve.

Referring now to FIGS. 2a, 2b, 3a, and 3b, the flange plate 18 is shown including an enlarged spool, referenced herein as an end plate spool 24 which is integrally formed with and centrally positioned perpendicular to flange plate 18. The diameter across end plate spool 24 is sized to allow cartridge spool 16 (FIG. 3b) to slide over spool 24, mounted thereon. A small key or projection 42 fits into cartridge slot 16a which keys or holds the cartridge spool 16 in place to prevent rotation relative to the spool 24. The reel end flange plate 18 is rotated by handle 20 along with cartridge spool 16 relative to shaft 14 on reel frame 12. The end plate 18 includes a rotatable handle 20 which allows the user to wind or unwind fishing line on cartridge spool 16. A counter weight 50 is included.

The end plate spool 24 includes a cartridge spool locking member 26 that is manually actuated as described below.

FIGS. 2a and 2b show locking member 26 in the unlocked position seated on a shelf 24b formed relative to end plate spool 24. The locking member 26 can be manually rotated approximately 90 degrees as shown in FIGS. 3a and 3b to the locking position of locking member 26. The locking member 26 is affixed to one end of spring 30 and mounted with the spring 30 in small narrow passage bored out within end plate spool 24. The purpose of locking member 26 is to prevent accidental separation of cartridge spool 16 from plate spool 24 in the locked position and an easy way to exchange cartridges or change from right to left retrieve by flipping over the cartridge.

FIG. 4 shows L-shaped locking member 26 which is a unitary member having a retainer arm 26b and a cylindrical body portion 26a that has an internal cylindrical hollow passage to receive an end of spring 30. Spring 30 end is firmly attached by adhesive or other means within the hollow passage of locking member cylindrical body 26a. The opposite end of spring 30 includes an annular ring portion 30b which itself is locked inside of plate 18 to pin 30a shown in FIGS. 2b and 3b mounted in recess 22a in flange plate 24. At the factory when the spring 30 and locking member are installed, the locking member once affixed to spring 30 is rotated until rotational spring tension is produced so that in the unlocked position, retaining arm 26b rests on a ledge 24b recessed portion 24b on spool 24. In the locked position retaining arm 26b projects out somewhat radially and rests within groove 24e so that arm 26b cannot rotate when positioned slightly below the top edge of ledge 24b while pressing against the cartridge spool 16 as shown in FIGS. 3a and 3b.

To manually remove a cartridge spool 16 that is held and retained against flange plate 18 on plate spool 24, the user would pull on the outer edge of the cartridge spool 16 axially which forces locking member 26 to move away from plate 18 along passage opening 24e until the bottom of lever arm 26b reaches a point above ledge 24b at which time the spring tension from spring 30 will automatically rotate and force lever arm 26b inwardly towards passage 24d causing it to rest on ledge 24b. Whenever the lever arm 26b is resting on ledge 24b, there is sufficient clearance from the inside passage of cartridge spool 16 to be removed from end plate spool 24. Inadvertent or accidental separation of cartridge 16 from spool 24 cannot happen as long as the locking member 26 is in the locked position as shown in FIGS. 3a and 3b inasmuch as it takes manual force of pulling on the cartridge along the spool axial direction away from plate 18 to physically lift locking member 26 outwardly axially until there is clearance along groove 24e for the retaining arm 26b which engages the cartridge spool 16 (shown in FIG. 3b) allowing the spring tension to rotate the lever 26b inwardly away from the cartridge spool 16. The cartridge spool includes a tapered annular ring about the interior passage 16b defined by tapered annular lip 16c which aids in allowing the locking member 26 and especially retaining arm 26b to rotate under the spring tension inwardly away from the cartridge spool 16. In the locked position, a sufficient portion of lever arm 26b is disposed below the ledge 24b and is within passage 26e so that arm 26b cannot rotate.

To install a cartridge spool 16, the user would employ an empty plate spool 24 on plate 18 which has been itself disengaged from the reel frame and would slide the cartridge spool 16 noting the lineup of key 24 to slot 16a (FIG. 1) until one side of the cartridge spool 16 is flush against flange plate 18. The user would then manually grasp retainer arm 26b rotating it against spring tension and depositing lever arm 26b into the passage 24e slightly downwardly towards flange plate 18 so that it is locked in place by passage 24e. At this point the cartridge spool 16 is secured to flange plate 18 and spool 24. The flange plate 18 is then locked against the reel frame ready for use.

By using the present invention locking member, interchangeable cartridges are fastened to the shaft and to the end plate face so that they will not accidentally become dislodged. However, the cartridge spools can be easily and quickly interchanged and flipped over to change the retrieved direction from left to right.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A fishing reel for fly fishing of the type that utilizes interchangeable fishing line cartridge spools that are individually installed and removed from the fishing reel, said fishing reel comprising:

a fishing reel frame including a rigid body, a rigid elongated shaft protruding from said rigid body;

a flange plate removably and rotatably mounted to said fishing reel frame, said flange plate including a hollow substantially cylindrical flange plate spool protruding therefrom, said flange plate spool having a predetermined outside diameter and defining a sleeve, said sleeve having a shape and size for rotatably receiving said rigid elongated shaft to facilitate the removable and rotatable mounting of said flange plate to said fishing reel frame;

means, attached to said flange plate, for releasably securing said flange plate to said fishing reel frame;

a cartridge spool, removably mountable to said flange plate spool, for holding fishing line, said cartridge spool having a cylindrical passageway with a diameter corresponding to said flange plate spool outside diameter for snugly fitting said cartridge spool on said flange plate spool; and means for selectively locking said cartridge spool to said flange plate spool to prevent said cartridge spool from accidentally slipping off said flange plate spool when said flange plate is removed from said fishing reel frame, said cartridge spool locking means comprising a biasing member and a spring, said member having a first leg and a second leg, and said spring being attached to said second leg and said flange plate spool, said first leg being movable between a first unlocked position to allow said cartridge spool to be mounted on said flange plate spool and a second locked position engaging said cartridge spool so as to prevent its accidental slipping from said flange plate spool, said cartridge spool locking means further comprising a passage defined by said flange plate spool for receiving said spring and said second leg, said spring being attached to said flange plate spool from within said passage.

2. A fishing reel as recited in claim 1, further comprising:

means, attached to said flange plate, for manually rotating said flange plate about said rigid elongated shaft; and means, defined by said flange plate spool and said cartridge spool, for preventing rotational motion said cartridge spool around said flange plate spool.

3. A fishing reel as recited in claim 1, wherein said cartridge spool locking means is rotatably affixed to said flange plate spool.

4. A fishing reel as in claim 1, wherein said cartridge spool locking means further comprises:

a ledge defined by a cutout in a free end of said flange plate spool within said outside diameter, said ledge being in substantial alignment with said passage for receiving said first leg in said unlocked position.

5. A fishing reel as in claim 4, wherein:

said first leg is sized to fall within said outside diameter of said flange plate spool when in said unlocked position permitting said cartridge spool to be easily installed and removed from said flange plate spool, and beyond said outside diameter when in said locked position preventing said cartridge spool from slipping off said flange plate spool.

6. A fishing reel for fly fishing of the type that utilizes interchangeable fishing line cartridge spools that are individually installed and removed from the fishing reel, said fishing reel comprising:

a fishing reel frame including a rigid body, a rigid elongated shaft protruding from said rigid body;

a flange plate removably and rotatably mounted to said fishing reel frame, said flange plate including a hollow substantially cylindrical flange plate spool protruding therefrom, said flange plate spool having a predetermined outside diameter and defining a sleeve, said sleeve having a shape and size for rotatably receiving said rigid elongated shaft to facilitate the removable and rotatable mounting of said flange plate to said fishing reel frame;

means, attached to said flange plate, for releasably securing said flange plate to said fishing reel frame;

a cartridge spool, removably mountable to said flange plate spool, for holding fishing line, said cartridge spool having a cylindrical passageway with a diameter corresponding to said flange plate spool outside diameter for snugly fitting said cartridge spool on said flange plate spool; and means for selectively locking said cartridge spool to said flange plate spool to prevent said cartridge spool from accidentally slipping off said flange plate spool when said flange plate is removed from said fishing reel frame, said cartridge spool locking means comprising an L-shaped member having a first leg and a second leg, and a spring attached to said second leg and said flange plate spool, said first leg being movable between a first unlocked position, so as to allow said cartridge spool to be mounted on said flange plate spool, and a second locked position, so as to engage said cartridge spool for preventing said cartridge spool from unintentionally slipping off said flange plate spool; said cartridge spool locking means further comprising a passage defined by said flange plate spool for receiving said spring and said second leg, said spring being attached to said flange plate spool from within said passage.

7. A fishing reel as in claim 6, wherein said cartridge spool locking means further comprises:

a ledge defined by a cutout in a free end of said flange plate spool within said outside diameter, said ledge being in substantial alignment with said passage for receiving said first leg in said unlocked position.

8. A fishing reel as in claim 7, wherein:

said first leg is sized to fall within said outside diameter of said flange plate spool when in said unlocked position permitting said cartridge spool to be easily installed and removed from said flange plate spool, and beyond said outside diameter when in said locked position preventing said cartridge spool from slipping off said flange plate spool.

9. A fishing reel as recited in claim 8, further comprising:

means, attached to said flange plate, for manually rotating said flange plate about said rigid elongated shaft; and means, defined by said flange plate spool and said cartridge spool, for preventing rotational motion of said cartridge spool around said flange plate spool.

10. A fishing reel as in claim 9, wherein said rotational prevention means comprises:

a flange protruding from said flange plate spool; and a groove defined by said cartridge spool cylindrical passageway adapted for receiving said flange when said cartridge spool is mounted to said flange plate spool.

11. A fishing reel as in claim 10, wherein said flange plate securing means comprises:

a spring loaded latch disposed in said flange plate sleeve for releasably grabbing said rigid elongated shaft when said elongated shaft is inserted in said sleeve.

* * * * *